United States Patent [19]
Logan
[11] 3,749,898
[45] July 31, 1973

[54] APPARATUS FOR MULTIPLYING BINARY SIGNALS BASED ON THE BINOMIAL THEOREM

[75] Inventor: J. Robert Logan, Canoga Park, Calif.
[73] Assignee: Litton Systems, Inc., Beverly Hills, Calif.

[22] Filed: Oct. 26, 1971
[21] Appl. No.: 191,985

[52] U.S. Cl. .......... 235/164
[51] Int. Cl. .......... G06f 7/52
[58] Field of Search .......... 235/164, 194, 175, 235/176

[56] References Cited
UNITED STATES PATENTS

| | | | |
|---|---|---|---|
| 3,031,143 | 4/1962 | McCoy et al. | 235/194 |
| 3,191,017 | 6/1965 | Takeo Miura et al. | 235/194 |
| 3,610,906 | 10/1971 | Stampler | 235/164 |

*Primary Examiner*—Eugene G. Botz
*Assistant Examiner*—David H. Malzahn
*Attorney*—Alan C. Rose, Walter R. Thiel and Robert M. Angus et al.

[57] ABSTRACT

Apparatus for multiplying binary signals based on the Binomial Theorem $2AB = (A+B)^2 - (A^2 + B^2)$. The apparatus utilizes accumulator and squaring techniques to minimize computer time.

14 Claims, 5 Drawing Figures

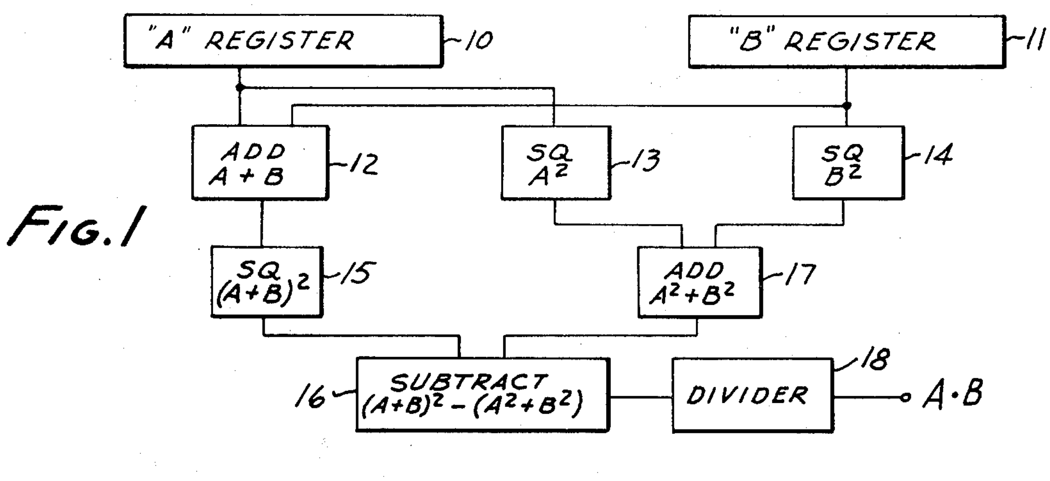
FIG. 1
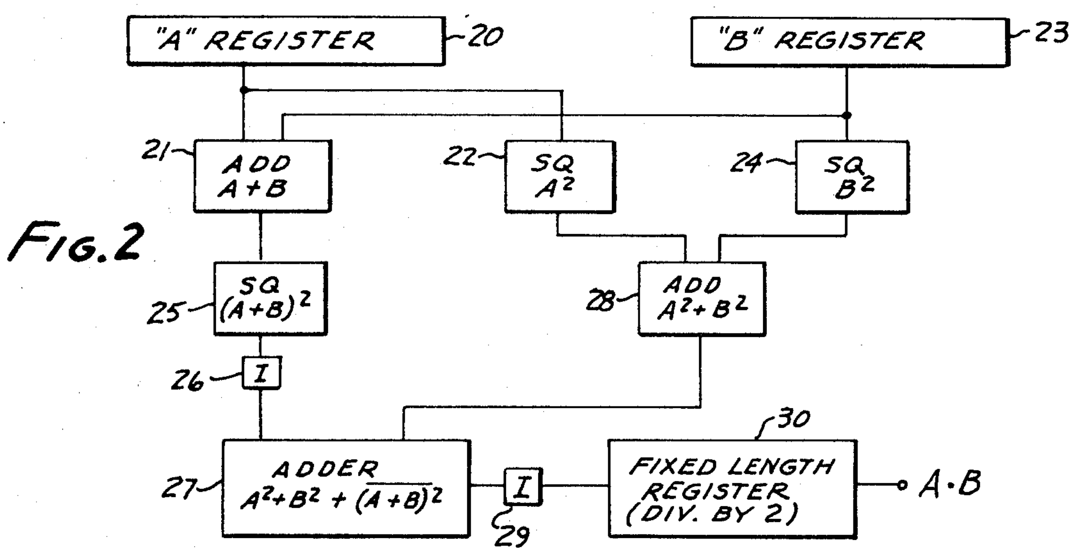
FIG. 2
A=00011 B=01001
FIRST ADDITION CYCLE (2 CYCLES)
| REGISTER NO. | REGISTER CONTENT | BIT PATTERN |
|---|---|---|
| 21 | A + B | 0 1100 |
| 28 | $A^2 + B^2$ | 0 0101 1010 |
SECOND ADDITION CYCLE (1 CYCLE)
| | | |
|---|---|---|
| | $\overline{(21)^2}$ + (28) | 1 1100 1001 |
| | INVERTING | 0 0011 0110 |
DROPPING 1ST DIGIT (DIVIDING BY 2)
FINAL PRODUCT 0001 1011
FIG. 3
INVENTOR.
JAMES ROBERT LOGAN
BY Robert M. Angus
ATTORNEY.

INVENTOR.
JAMES ROBERT LOGAN
BY Robert M. Angus
ATTORNEY.

A=10011011 → A1=1001, A2=1011

B=11101100 → B1=1110, B2=1100

FIRST ADDITION (2 CYCLES)

| REGISTER NO. | REGISTER CONTENT | BIT PATTERN (BASIC) |
|---|---|---|
| 43 | A1 + B2 | 10101 |
| 55 | $A1^2 + B2^2$ | 0011100001 |
| 46 | A2 + B1 | 11001 |
| 57 | $A2^2 + B1^2$ | 0100111101 |
| 45 | A2 + B2 | 10111 |
| 53 | $A2^2 + B2^2$ | 0100001001 |
| 42 | A1 + B1 | 10111 |
| 51 | $A1^2 + B1^2$ | 0100010101 |

SECOND ADDITION (1 CYCLE)

| | | |
|---|---|---|
| 62 | $(43)^2 + \overline{(55)}$ | 0011010111 |
| 64 | $(46)^2 + \overline{(57)}$ | 0100110011 |
| 60 | $\overline{(45)^2} + (53)$ | 1011110111 |
| 58 | $\overline{(42)^2} + (51)$ | 1100000011 |

THIRD ADDITION (1 CYCLE)

(58): 1100000011 (60): 1011110111

DROPPING END BITS FROM REGISTERS 58 AND 60 AND INVERTING → $\overline{01111110}$ $\overline{10000100}$ 00000110 10111000

NOTE CENTRAL POSITION OF BIT PATTERN IN REG. 62

(64): 0100110011
0000000010

SUBTRACT COMPENSATION IN REG. 69 → 0100110101

RESULT IN REG. 70 1000010100111100

FOURTH ADDITION (1 CYCLE)

| | | |
|---|---|---|
| REGISTER 70: | 1000010100111100 | |
| REGISTER 69: | 0100110101 | |
| REGISTER 71: | 1000111011100100 | (FINAL PRODUCT) |

FIG. 5

INVENTOR
JAMES ROBERT LOGAN
BY
Robert M. Angus
ATTORNEY

APPARATUS FOR MULTIPLYING BINARY SIGNALS BASED ON THE BINOMIAL THEOREM

This invention relates to binary multipliers, and in particular to binary multipliers requiring minimal time to affectuate the multiplication of two binary numbers.

Heretofore, computer multiplying systems have utilized a form of repetitive addition cycles. For example, to multiply A times B, where A and B are numbers in binary form, it has been the practice to add A to itself B−1 number of times. However, a single addition of binary numbers requires at least two cycles of the computer to accomplish. When repeated through several addition sets, the time required to multiply two numbers is relatively great. For example, to multiply A times B, it can be shown that B+1 computer cycles are necessary to complete the multiplication.

It is an object of the present invention to provide multiplier apparatus wherein the number of addition cycles are minimized, thereby reducing the time required for the computer to accomplish the multiplication function.

Another object of the present invention is to provide a method of multiplying binary numbers by squaring binary signal sets to minimize addition steps.

Another object of the present invention is to provide a method and apparatus for multiplying binary numbers by a double precision squaring technique.

In accordance with the present invention, multiplication of numbers is accomplished by accumulating squares in accordance with the Binominal Theorem $2AB=(A+B)^2-A^2-B^2$. From the result, the product AB may be obtained.

One feature of the present invention resides in the provision of apparatus for double precision multiplication utilizing accumulating and squaring techniques.

The above and other features of this invention will be more fully understood from the following detailed description and the accompanying drawings, in which:

FIG. 1 is schematic block logic and circuit diagram of a multiplier in accordance with one form of the present invention;

FIG. 2 is a block logic and circuit diagram of a multiplier in accordance with another form of the present invention;

FIG. 3 is a table illustrating the operation of the multiplier illustrated in FIG. 2;

FIG. 5 is a table illustrating the operation of the multiplier illustrated in FIG. 4.

Figure 4:
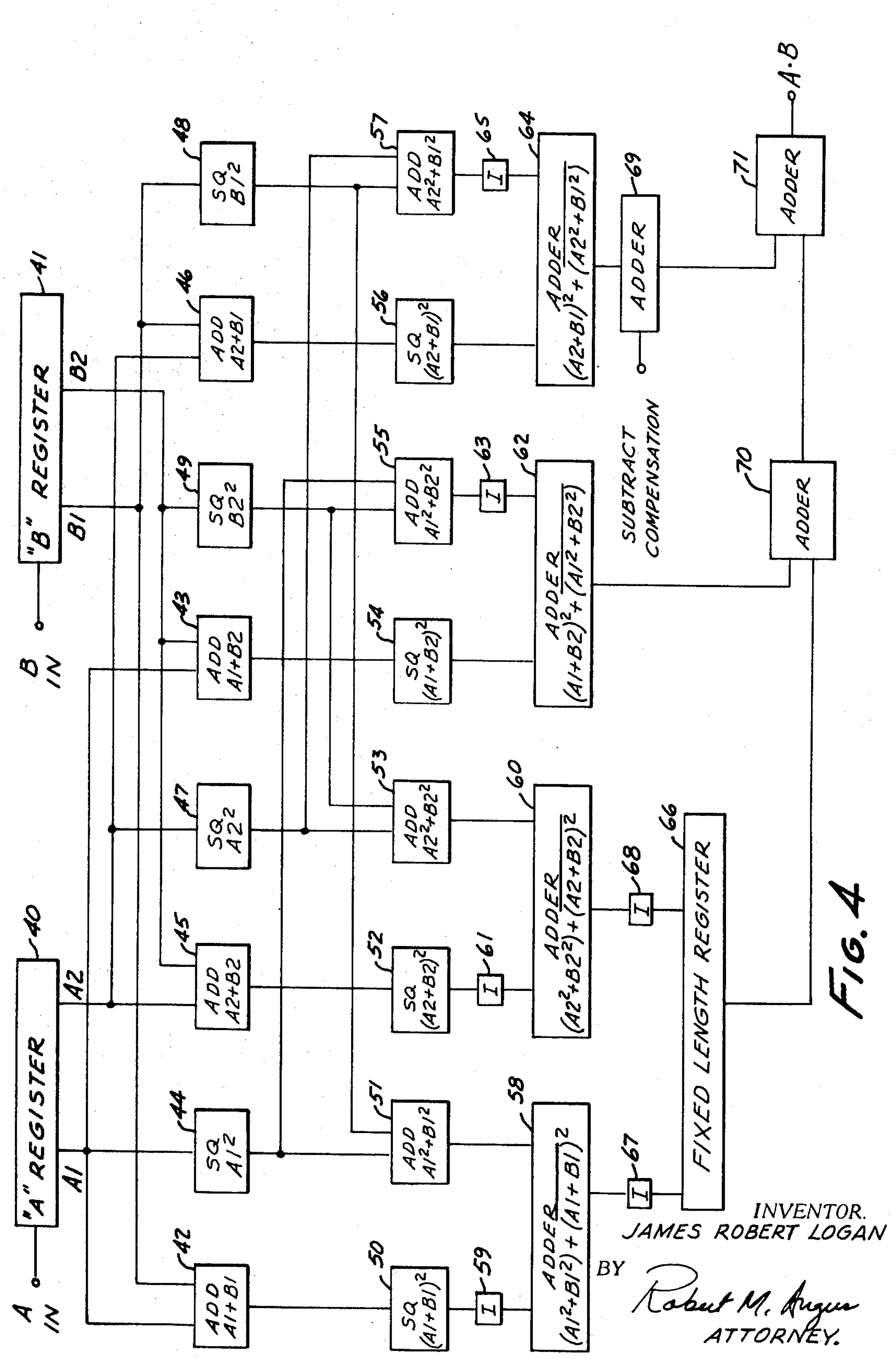
FIG. 4 is a block logic and circuit diagram of a multiplier in accordance with the presently preferred embodiment of the present invention.

FIG. 1 is a block logic and circuit diagram of a multiplier in accordance with the present invention. The logic diagram illustrated in FIG. 1 accomplishes multiplication of two numbers by means of the Binominal Theorem. In its simplicity, the logic accomplished by the circuit illustrated in FIG. 1 performs the function $2AB=(A+B)^2-(A^2+B^2)$. By dividing the result by decimal 2, the product AB is obtained. As illustrated in FIG. 1, registers 10 and 11 are provided for storing the "A" and "B" binary signal sets representative of numbers A and B, respectively. "A" register 10 provides one input for adder, or accumulator 12 and provides an input to the squaring device 13. "B" register 11 provides a second input for adder 12 and an input for squaring device 14. The output of adder 12 is connected to the input of squaring device 15 whose output provides one input for subtractor 16. By way of example, squaring devices 13, 14 and 15 may comprise a gated squaring circuit as more fully described and illustrated in "A Design Technique For Digital Squaring Networks" by J. R. Logan, in "Computer Design", February, 1970, pages 84 et seq. Alternatively, a non-gated additive squaring device may be utilized as more fully described and illustrated in U.S. Pat. No. 2,890,829. The outputs of squaring devices 13 and 14 provide respective inputs to adder, or accumulator 17, which in turn provides an input to subtractor 16. The output of subtractor 16 is connected to divider 18 which divides the result by decimal 2 to provide an output binary signal representative of the product of A and B. One example of suitable adders 12 and 17 is more fully described and illustrated in "Arithmetic Operations And Digital Computers" by R. K. Richards, published by D. Van Nostrand Co., Inc., New York, N.Y., in 1955 at pages 53 et seq.

In operation of the apparatus illustrated in FIG. 1, the binary signal sets A and B are added together in adder 12, and the numbers $A^2$ and $B^2$ are developed in squaring devices 13 and 14, respectively. The signal in adder 12 is squared in squaring device 15, to derive $(A+B)^2$, and the signals representative of $A^2$ and $B^2$ are added together in adder 17 to derive $A^2+B^2$. The result from adder 17 is subtracted by subtractor 16 from the result in squaring device 15 to derive $(A+B)^2-(A^2+B^2)$. The result from subtractor 16 is divided by decimal 2 in divider 18 to derive the product AB. By way of example, divider 18 may comprise a fixed length register whose function is to drop the least significant bit from the binary signal set received from subtractor 18, thus effectuating a digital division by 2.

One feature of the invention illustrated in FIG. 1 resides in the fact that only three cycles of the computer are required to accomplish the multiplication. By utilizing a gated squaring device as described in the aforementioned article by J. R. Logan, the squaring devices 13, 14 and 15 require virtually no computer time. Adders 12 and 17 require a first cycle of the computer to establish the necessary gating of the respective adding circuit and a second computer cycle to accomplish the adding function. Further, subtractor 16 may be gated during the second computer cycle while adders 12 and 17 are accomplishing their add function. Hence, subtractor 16 requires only one additional computer cycle to accomplish its function. Divider 18, which merely drops or masks out the least significant bit from the result, requires no additional computer time. Hence, it is evident that the product AB may be accomplished in three cycles of the computer, as compared to the more lengthy time required to accomplish multiplication by systems heretofore used. Hence, if the computer cycle time is of the order of 200 nanoseconds, the time required to multiply A and B with the apparatus illustrated in FIG. 1 is of the order of 600 nanoseconds.

FIG. 2 illustrates another embodiment of the multiplier in accordance with the presently preferred embodiment which utilizes complementing and adding techniques instead of subtracting circuits. In FIG. 2, "A" register 20 provides inputs to adder 21 and to squaring device 22, and "B" register 23 provides inputs to adder 21 and squaring device 24. Adder 21 adds the binary signal sets A and B to derive a binary set representative of A+B, squaring device 22 squares the binary set A to derive a binary set representative of $A^2$, and squaring device 24 squares the binary set B to derive a binary set representative of $B^2$. The output from adder 21 is forwarded to squaring device 25 to square A+B to derive a binary signal set representative of $(A+B)^2$. The output from squaring device 25 is complemented by inverter 26 and forwarded to adder 27. The outputs from squaring devices 22 and 24 are added by adder 28, the result of which is forwarded to adder 27. As a result, adder 27 derives a binary set representative of $A^2+B^2+\overline{(A+B)}^2$. The output from adder 27 is complemented by inverter 29 and forwarded to fixed length register 30 which drops or masks the least significant bit from the binary set to derive the product AB.

Inverters 26 and 29 complement the binary values of the bits of the binary sets introduced to the respective inverters by reversing the binary value of each bit. Hence, inverters 26 and 29 substitute binary "1"s for "0"s and "0"s for "1"s. The feature is conventionally known as "ones complementing".

With reference to FIG. 3, the operation of apparatus illustrated in FIG. 2 may be explained. Assuming it is desirable to multiply A times B, where A equals 3 and B equals 9, a binary set representative of A is inserted into register 20 and a binary set representative of B is inserted into register 23. Hence, in the example, register 20 contains a binary set appearing as 0011 and register 23 contains a binary set appearing as 1001. The binary sets from registers 20 and 23 are added together in adder register 21 to obtain a binary set of 01100. The binary sets from registers 20 and 23 are also individually squared in squaring devices 22 and 24 to obtain binary sets of 01001 and 1010001 (representative of $3^2$ and $9^2$), respectively. The binary sets from squaring devices 22 and 24 are added together by adder register 28 to derive the binary set 001011010 (representative of $3^2+9^2$).

It should be noted that by using gated squaring devices as described in the aforementioned article by J. R. Logan, the A+B and $(A^2+B^2)$ binary sets may be accomplished in two cycles of the computer. The capacity of adder registers 21 and 28 must be at least one bit larger than the largest bit set of their respective inputs. Hence, if the length of the binary sets representing A and B have a maximum length of n bits, adder register 21 should have a capacity of $n+1$ bits and adder register 28 should have a capacity of $2n+1$ bits.

The binary set (01100) from adder 21 is squared by squaring device 25 to obtain a binary set 010010000 (representative of $(3+9)^2$), which in turn is complemented by inverter 26 to obtain 101101111. Adder 27 adds the binary sets from inverter 26 and adder 28 to obtain a binary set 111001001.

The binary set in adder register 27 is complemented by inverter 29 to derive binary set 000110110. Register 30 then drops the least significant bit from the binary set to obtain 00011011, which is the binary equivalent of 27 (3×9).

It should be noted that the least significant bit of the output binary signal set from inverter 29 will always be a "0" so that the dropping of the least significant bit to effectuate division by 2 will have no degrading effect on the result. It can be shown that when the least significant bit of $(A+B)^2$ is a zero, the least significant bit of $A^2+B^2$ is also a zero. Conversely, when the least significant bit of $(A+B)^2$ is a one, the least significant bit of $A^2+B^2$ is also a one. Hence, in either case when $A^2+B^2$ is subtracted from $(A+B)^2$, the least significant bit will be a zero.

It should further be noted that register 27 may be a fixed length register equal to $2n$ bit positions to drop the least significant bit from the bit set before complementing. Hence, the functions of registers 27 and 30 may be combined into register 27.

In the example described and illustrated in connection with FIGS. 2 and 3, it has been assumed that a relatively small decimal number having a short binary equivalent is being added to a similar number. It is evident that as the decimal numbers increase in value, the binary sets will increase in length. As a result, the size of the registers and accumulators may become quite large. Accordingly, in FIG. 4 there is illustrated a multiplier apparatus capable of handling relatively large binary sets by double precision multiplication. In the prior examples, when the sum (A+B) is to be squared, and where both A and B have the same number of bits, one extra bit position must be reserved to contain the carry. As a result, the multiplication of two $n$-bit variables requres a squaring network capable of squaring $n+1$ variables. Assuming the size of the network is capable of handling b 10 bits, it is thus evident that only two 9-bit sets could be combined to produce an 18-bit product. Through the use of double precision multiplication, two 18-bit sets may be multiplied to produce a 36-bit product using apparatus capable of handling 10-bit sets.

Assuming that the multiplicand and multiplier, A and B, comprise components $A_1$, $A_2$ and $B_1$, $B_2$, respectively, and assuming that the number of bits in A and B are the same, and that the number of bits is even, $A_1$, $A_2$ and $B_1$, $B_2$ each will have the same number of bits. If $A_1$, $A_2$, $B_1$ and $B_2$ each have m bits where $m=n/2$ and $n$ is the original bit length for each of A and B, the following relations are apparent:

$$A=A_1\times2^m+A_2$$

$$B=B_1\times2^m+B_2$$

$$AB=A_1B_1\times2^{2m}+A_1B_2\times2^m+A_2B_1\times2^m+A_2B_2$$

Only two addition cycles of the computer are required to perform the foregoing algorithm because when $A_1B_1$ is shifted 2 m places in a register, $A_2B_2$ may be positioned in the 2 $m$ least significant locations in the register to accomplish $A_1B_1\times2^{2m}+A_2B_2$ without requiring an add function. The logic circuit diagram for accomplishing the foregoing relationship is illustrated in FIG. 4.

In FIG. 4 there is illustrated an A register 40 and a B register 41, each having an output for obtaining $A_1$ and $A_2$, and $B_1$ and $B_2$ respectively. The $A_1$ output provides inputs to adders 42 and 43 and to squaring device 44, the $A_2$ output provides inputs to adders 45 and 46 and to squaring device 47, the $B_1$ output provides inputs to adder 42 and 46 and to squaring device 48, and the $B_2$ output provides inputs to adders 43 and 45 and to squaring device 49. The output of adder 42 is supplied to the input of squaring device 50, the outputs of squaring devices 44 and 48 provide inputs to adder 51, the output from adder 45 provides an input to squaring device 52, the output of squaring devices 47 and 49 provide inputs to adder 53, the output of adder 43 provides an input to squaring device 54, the output of squaring devices 44 and 49 provide inputs to adder 55, the output of adder 46 provides an input to squaring device 56, and the output of squaring devices 47 and 48 provide inputs to adder 57. As will be more fully understood hereinafter, all of the logic performed by adders and squarers 42–57 may be accomplished in two cycles of the computer. As a result of the operation of adders and squarers 42–57, squaring device 50 provides a binary signal set representative of $(A_1+B_1)^2$, adder 51 provides a binary signal set representative of $A_1^2+B_1^2$, squaring device 52 provides a binary signal set representative of $(A_2+B_2)^2$, adder 53 provides a binary signal set representative of $A_2^2+B_2^2$, squaring device 54 provides a binary signal set representative of $(A_1+B_2)^2$, adder 55 provides a binary signal set representative of $A_1^2+B_2^2$, squaring device 56 provides a binary signal set representative of $(A_2+B_1)^2$, and adder 57 provides a binary signal set representative of $A_2^2+B_1^2$.

Adder 58 receives one input from adder 51 and a second input from inverter 59 whose input is in turn received from squaring device 50. Adder 60 receives one input from adder 53 and a second input from squaring device 52 through inverter 61. Adder 62 receives one input from squaring device 54 and a second input from adder 55 through inverter 63. Adder 64 receives one input from squaring device 56 and a second input from adder 57 through inverter 65.

Fixed length register 66 receives one input from adder 58 through inverter 67 and a second input from adder 60 through inverter 68. The arrangement of fixed length register 66 is such as to drop the most and least significant bits from the complemented binary sets from each of adder registers 58 and 60, and to combine resultant signal sets in an end-to-end relationship so that the complemented result from adder register 58 $(A_1B_1)$ comprises the most significant bits of the signal in register 66 while the complemented result from adder register 60 $(A_2B_2)$ comprises the least significant bits of the signal in register 66. As a result, the bit-set in register 66 is representative of $A_1^2+B_2^2+A_2B_2$.

The dropping of the least significant bits from the signal sets from each of adders 58 and 60 has the effect of dividing each of the sets by decimal 2. The most significant bits are dropped so that the remaining portions of the signals from adders 58 and 60 each contain the same number of bits ($n$) as appear in the length of the original numbers, i.e. A and B.

The circuitry associated with adders 62, 64 and 69 has the effect of developing binary signal sets representative of $2A_1B_2$ and $2A_2B_1$. This is accomplished by performing the algorithms $2A_1B_2=(A_1+B_2)^2-(A_1^2+B_2^2)$ and $2A_2B_1=(A_2+B_1)^2-(A_2^2+B_1^2)$. One conventional method of subtracting is to complement the subtrahend and add the result to the minuend, together with a subtract compensate signal. In the case of a single subtraction operation, the subtract compensate signal is binary "1". In the present invention, since the results from both subtraction operations are to be added together, it is just as convenient to add the subtract compensation for both subtract operations to one or the other subtraction results. Hence, the output from adder register 62 is representative of $2A_1B_2-1$ and the output from adder register 69 is $2A_2B_1+1$.

Adder register 70 is arranged to centrally position the binary set from adder 62 against the binary set from fixed length register 66. This function, which can be accomplished by hard wiring the registers, has the effect of shifting the binary signal set from adder 62 to the left by $m-1$ positions. Hence, the binary set from adder register 62 appears in register 70 as $2^{m-1}(2A_1B_2-1)$, which is equivalent to $A_1B_2\times2^m-2^{m-1}$. Thus, the output from register 70 is equivalent to $A_1B_1\times2^{2m}+A_2B_2+A_1B_2\times2^m-2^{m-1}$.

Adder 71 is arranged as to centrally position the binary set from adder 69 against the binary set from adder 70. This function, which can be accomplished by hard wiring the registers, has the effect of shifting the binary signal set from adder 69 to the left by $m-1$ positions. Hence, the binary set from adder 69 appears in register 70 as $2^{m-1}(2A_2B_1+1)$, which is equivalent to $A_2B_1\times2^m+2^{m-1}$. When this result is added to the binary signal set from adder 70, the $2^{m-1}$ functions drop out, and the algorithm $A_1B_1\times2^{2m}+A_1B_2\times2^m+A_2B_1\times2^m+A_2B_2$ is accomplished. Hence, the output binary signal set from adder 70 is representative of the product AB.

In operation of the apparatus illustrated in FIG. 4, and with reference to FIG. 5, let it be assumed that A is 155 in decimal form and the B is 236 in decimal form. Hence, in binary form, A is 10011011 and B is 11101100. Hence, $A_1$ equals 1001, $A_2$ equals 1011, $B_1$ equals 1110, and $B_2$ equals 1100.

During the first addition cycle (which requires two cycles of the computer), $A_1$, $A_2$, $B_1$ and $B_2$ are each squared, and the addition functions accomplished by adder registers 42, 43, 45, 46, 51, 53, 55 and 57 are performed. Hence, during the first and second computer cycles the relationships set forth in Table I are accomplished.

Table I

| Device | Function | Bit Pattern |
|---|---|---|
| 42 | $A_1+B_1$ | 00 0001 0111 |
| 45 | $A_2+B_2$ | 00 0001 0111 |
| 43 | $A_1+B_2$ | 00 0001 0101 |
| 46 | $A_2+B_1$ | 00 0001 1001 |
| 44 | $A_1^2$ | 00 0101 0001 |
| 47 | $A_2^2$ | 00 0111 1001 |
| 48 | $B_1^2$ | 00 1100 0100 |
| 49 | $B_2^2$ | 00 1001 0000 |
| 51 | $A_1^2+B_1^2$ | 01 0001 0101 |
| 53 | $A_2^2+B_2^2$ | 01 0000 1001 |
| 55 | $A_1^2+B_2^2$ | 00 1110 0001 |
| 57 | $A_2^2+B_1^2$ | 01 0011 1101 |

If the squaring devices are gated squaring devices as described in the aforementioned J. R. Logan article, no computer time is required for squaring the functions by squaring devices 50, 52, 54 and 56, or for the complementing functions provided by inverters 59, 61, 63 and 65. Hence, before the start of the third computer cycle, the relationships set forth in TABLE II have been completed.

TABLE II

| Device | Function | Bit Pattern |
|---|---|---|
| 50 | $(A_1+B_1)^2$ | 01 1101 0001 |
| 59 | $\overline{(A_1+B_1)^2}$ | 10 0010 1110 |
| 52 | $(A_2+B_2)^2$ | 10 0001 0001 |
| 61 | $\overline{(A_2+B_2)^2}$ | 01 1110 1110 |
| 54 | $(A_1+B_2)^2$ | 01 1011 1001 |
| 63 | $A_1^2+B_2^2$ | 11 0001 1110 |
| 56 | $(A_2+B_1)^2$ | 10 0111 0001 |
| 65 | $\overline{A_2^2+B_1^2}$ | 10 1100 0010 |

During the third computer cycle the second addition cycle in registers 59, 60, 62 and 64 may be completed. Since adder registers 58, 60, 62 and 64 can be gated during the execution cycle associated with the adders involved in the first addition step, only a single execution cycle of the computer is required to accomplish the functions set forth in TABLE III.

TABLE III

| Device | Function | Bit Pattern |
|---|---|---|
| 58 | $(A_1^2+B_1^2)+\overline{(A_1+B_1)^2}$ | (1) 11 0000 0011 |

| | | |
|---|---|---|
| 60 | $(A_2^2+B_2^2)+\overline{(A_2+B_2)^2}$ | 10 1111 0111 |
| 62 | $(A_1+B_2)^2+\overline{(A_1^2+B_2^2)}$ | 00 1101 0111 |
| 64 | $(A_2+B_1)^2+\overline{(A_2^2+B_1^2)}$ | 01 0011 0011 |

The bit pattern for the set in register 58 is shown to have 11 bits. However, in the example, it has been assumed that the accumulator has a maximum length of 10 bits. Hence, the most significant bit is dropped. The dropping of the "1" bit from the most significant position of register 58 will not affect the result because even if the "1" was retained, it would be converted to a "0" during the next complement step, and the effect of the register size is eliminated.

The outputs of adder registers 58 and 60 are complemented to accomplish the function set forth in TABLE IV.

TABLE IV

| Device | Function | Bit Pattern |
|---|---|---|
| 67 | $\overline{(A_1^2+B_1^2)+\overline{(A_1+B_1)^2}}$ | 00 1111 1100 |
| 68 | $\overline{(A_2^2+B_2^2)+(A_2+B_2)^2}$ | 01 0000 1000 |

In the example, it has been assumed that 10 bit accumulators have been used to accomplish addition functions. Fixed length register 66 is designed to accept binary sets from adder registers 58 and 60 which have twice the bit length of the sets ($A_1$, $A_2$, $B_1$, $B_2$) operated on. Hence, register 66, which is 4 $m$ bits in length, accepts only 2 $m$ bits from each of adders 58 and 60. Further, the register is arranged to drop the least significant bit from the binary sets received from adders 58 and 60, thus accomplishing the division by decimal 2 required for the final product. Thus, assuming, as in the example, that A and B each have 8 bits, $m$=4. Thus, register 66 drops the least significant bit from each of adders 58 and 60 and accepts only the next 2 $m$, or 8 bits from each set. Of course, if adders 58 and 60 are each fixed length registers of 10 bits each, register 66 merely drops or masks out the least and most significant bits from each signal. Hence, register 66 accepts 01111110 from inverter 67 and 10000100 from inverter 68.

Register 66 arranges the binary signal sets so that the output from register 66 has the accepted portion of the set from inverter 67 as the most significant portion of the output binary signal set and the accepted portion of the set from inverter 68 as the least significant portion of the output signal. Hence, in the example, register 66 contains: 0111 1110 1000 0100.

It should be noted that no computer cycles are required to accomplish the complementing and registering functions provided by inverters 67 and 68 and register 66.

During the fourth computer cycle, two distinct functions are performed, one being accomplished by adder register 70 and the other by adder register 69.

Adder register 70 adds the signal from adder 62 to the signal from register 66. However, register 62 contains 2($m$+1) bit portions whereas register 66 contains 4 $m$ bit positions. The signal from adder register 62 is shifted so as to be centrally located against the signal from register 66. Hence, the signal from adder register 62 must be shifted to the left $m-1$ bit positions before adding (three positions in the example). The result in register 70 is set forth in TABLE V.

At the same time, adder register 69 adds a subtract compensation signal to the binary signal from adder register 64 as heretofore described. As will be more fully understood hereinafter, the arrangement of inverter 63 and adder 62, and the arrangement of inverter 65 and adders 64 and 69 are functionally equivalent to two subtraction steps. Hence, the subtract compensation signal is equal to 2 in the example. Hence, the binary equivalent of decimal 2 ("10") is added to the binary signal set from adder 64. The result of the third addition step, accomplished during the fourth computer cycle, is set forth in TABLE V.

TABLE V

| Register | Bit Pattern |
|---|---|
| 70 | 1000 0101 0011 1100 |
| 69 | 01 0011 0101 |

During the fourth computer cycle, adder 71 is gated to accept the binary signal sets from adder registers 69 and 70. Adder register 71 shifts the binary set received from adder register 69 $m-1$ bit positions to the left so that the two sets to be added are centrally positioned. In the example, the set from adder register 69 is shifted 3 bit positions and is added to the set from adder register 70 during the fifth cycle of the computer as set forth in TABLE VI.

TABLE VI

| | | | | | |
|---|---|---|---|---|---|
| | 1000 | 0101 | 0011 | 1100 | |
| | 0 | 1001 | 1010 | 1 | |
| A·B= | 1000 | 1110 | 1110 | 0100 | =36,580 |

One feature of the present invention resides in the method and apparatus for subtracting two numbers. For example, and with reference to FIG. 2, the apparatus associated with inverters 26 and 29 and adder 27 is functionally equivalent to a binary subtractor. In the example given in connection with FIG. 2, A was assumed to be 3 and B was assumed to be 9. Hence, the binary output from squaring device 25 is representative of $(3+9)^2$, or 144. The binary output from adder 28 is representative of $3^2+9^2$, or 90. The binary equivalent of 144 is 10010000 and the binary equivalent of 90 is 01011010. If it is desired to subtract 90 from 144 (which would result in 2AB in the example given in connection with FIG. 2), the binary set for the minuend is complemented, then added to the subtrahend, and the result is inverted. The process is shown in TABLE VII.

TABLE VII

| Device | Function | Bit Pattern |
|---|---|---|
| 25 | Minuend | 1001 0000 |
| 26 | Minuend Complemented | 0110 1111 |
| 28 | Subtrahend | 0101 1010 |
| 27 | Addition | 1100 1001 |
| 29 | Complement | 0011 0110 |

The result, 00110110, is the binary equivalent of 54, which, of course, equals 144–90. The same subtraction technique appears in the apparatus shown in FIG. 4 in connection with adder 58 and inverters 59 and 67, and with adder 60 and inverters 61 and 68.

Although a subtraction technique relying on complementing the subtrahend, adding the result to the minuend, and adding a subtract compensate signal is illustrated in FIG. 4 in connection with the derivation of $A_1B_2$ and $A_2B_1$, it is to be understood that subtract apparatus in accordance with the present invention may be substituted for the apparatus shown in FIG. 4. In this regard, inverters 63 and 65 and adder 69 would be eliminated, and an inverter would be placed in the outputs of squaring devices 54 and 56 and in the outputs of adder registers 62 and 64. It is also to be understood that the binary signal sets from adders 62 and 69 could be added together, and the result be shifted $m-1$ positions as heretofore described, and then added to the output from register 66 to derive the final product.

The present invention thus provides apparatus and methods of multiplying binary signals in a minimum period of time. Using the double precision multiplication method and apparatus, it is possible to multiply relatively large binary signal sets in five cycles of the order of 200 nanoseconds. It is possible, using the present invention, to accomplish a multiplication function in 1 microsecond, or less. The present invention also provides a double complementing and addition technique for rapid subtraction of binary signal sets.

This invention is not to be limited by the embodiments shown in the drawings and described in the description, which are given by way of example and not of limitation, but only in accordance with the scope of the appended claims.

What is claimed is:

1. A multiplier for multiplying A times B, where A and B are numbers, said numbers being represented by first and second binary signal sets, respectively, said multiplier comprising: first data processor means for processing said first and second binary signal sets to derive a third binary signal set representative of $(A+B)^2$; second data processor means for processing said first and second binary signal sets to derive a fourth binary signal set representative of $A^2+B^2$; and third data processor means for processing said third and fourth binary signal sets to derive a fifth binary signal set representative of $(A+B)^2-(A^2+B^2)$.

2. Apparatus according to claim 1 further including means for dropping the least significant bit from said fifth binary signal set.

3. Apparatus according to claim 1 wherein said third data processor means comprises first complement means connected to said first data processor for reversing the binary values of each bit in said third binary signal set; first adder means connected to said first complement means and to said second data processor means for processing said fourth binary signal set and the reversed-bit third binary signal set to derive a binary output signal set representative of the sum of the numbers represented by said fourth binary signal set and said reversed-bit third binary set; and second complement means connected to said first adder means for reversing the binary values of each bit in said binary output signal set.

4. Apparatus according to claim 3 further including means for dropping the least significant bit from said fifth binary signal set.

5. Apparatus according to claim 3 wherein said first data processor means comprises second adder means for receiving said first and second binary signal sets, said second adder means processing said first and second signal sets to derive a binary signal set representative of the sum of A and B, and first squaring means connected to said second adder means for processing the binary signal set output of said first adder means to derive said third binary signal set.

6. Apparatus according to claim 5 wherein said second data processor means comprises second squaring means for processing said first binary signal set to derive a binary signal set representative of $A^2$, third squaring means for processing said second binary signal set to derive a binary signal set representative of $B^2$, and third adder means for processing the binary signal sets from said second and third squaring means to derive said fourth binary signal set.

7. Apparatus according to claim 6 wherein said first, second and third squaring means are gated squaring devices.

8. Apparatus according to claim 1 wherein said first data processor means comprises first adder means for receiving said first and second binary signal sets, said first adder means processing said first and second signal sets to derive a binary signal set representative of the sum of A and B, and first squaring means connected to said first adder means for processing the binary signal set output of said first adder means to derive said third binary signal set.

9. Apparatus according to claim 1 wherein said second data processor means comprises first squaring means for processing said first binary signal set to derive a binary signal set representative of $A^2$, second squaring means for processing said second binary signal set to derive a binary signal set representative of $B^2$, and first adder means for processing the binary signal sets from said first and second squaring means to derive said fourth binary signal set.

10. Apparatus for multiplying A times B, where A and B are numbers, said numbers being represented by first and second binary signal sets respectively, each of said first and second binary signal sets having $n$ bits where $n$ is an even whole number, said apparatus comprising:

first segregating means for segregating said first binary signal set into $A_1$ and $A_2$ binary signal sets each having $m$ bits, where $m=n/2$, said $A_1$ signal set comprising the $m$ most significant bits of said first binary signal set and said $A_2$ signal set comprising the $m$ least significant bits of said first binary signal set;

second segregating means for segregating said second binary signal set into $B_1$ and $B_2$ binary signal sets each having $m$ bits, said $B_1$ signal set comprising the $m$ most significant bits of said second binary signal set and said $B_2$ signal set comprising the $m$ least significant bits of said second binary signal set;

first data processor means for processing said $A_1$ and $B_1$ signal sets to derive a $(A_1+B_1)^2$ binary signal set representative of the square of the sum of the numbers represented by said $A_1$ and $B_1$ signal sets;

second data processor means for processing said $A_1$ and $B_1$ signal sets to derive a $(A_1^2+B_1^2)$ binary signal set representative of the sum of the squares of the numbers represented by said $A_1$ and $B_1$ signal sets;

third data processor means for processing said $A_2$ and $B_2$ signal sets to derive a $(A_2+B_2)^2$ binary signal set representative of the square of the sum of the numbers represented by said $A_2$ and $B_2$ signal sets;

fourth data processor means for processing said $A_2$ and $B_2$ signal sets to derive a $(A_2^2+B_2^2)$ binary signal set representative of the sum of the squares of the numbers represented by said $A_2$ and $B_2$ signal sets;

fifth data processor means for processing said $A_1$ and $B_2$ signal sets to derive a $(A_1+B_2)^2$ binary signal set representative of the square of the sum of the numbers represented by said $A_1$ and $B_2$ signal sets;

sixth data processor means for processing said $A_1$ and $B_2$ signal sets to derive a $(A_1^2+B_2^2)$ binary signal set representative of the sum of the squares of the numbers represented by said $A_1$ and $B_2$ signal sets;

seventh data processor means for processing said $A_2$ and $B_1$ signal sets to derive a $(A_2+B_1)^2$ binary signal set representative of the square of the sum of the numbers represented by said $A_2$ and $B_1$ signal sets;

eighth data processor means for processing said $A_2$ and $B_1$ signal sets to derive a $(A_2^2+B_1^2)$ binary signal set representative of the sum of the squares of the numbers represented by said $A_2$ and $B_1$ signal sets;

ninth data processor means for processing said $(A_1^2+B_1^2)$ and $(A_1+B_1)^2$ signal sets to derive an $(A_1B_1)$ binary signal set representative of one-half of the difference between the numbers represented by said $(A_1+B_1)^2$ signal set and said $(A_1^2+B_1^2)$ signal set;

tenth data processor means for processing said $(A_2^2+B_2^2)$ and $(A_2+B_2)^2$ signal sets to derive an $(A_2B_2)$ binary signal set representative of one-half of the difference between the numbers represented by said $(A_2+B_2)^2$ signal set and said $(A_2^2+B_2^2)$ signal set;

eleventh data processor means for processing said $(A_1+B_2)^2$ and $(A_1^2+B_2^2)$ signal sets to derive a third binary signal set representative of the difference between the numbers represented by said $(A_1+B_2)^2$ and $(A_1^2+B_2^2)$ signal sets;

twelfth data processor means for processing said $(A_2+B_1)^2$ and $(A_2^2+B_1^2)$ signal sets to derive a fourth binary signal set representative of the difference between the numbers represented by said $(A_2+B_1)^2$ and $(A_2^2+B_1^2)$ signal sets;

first register means for deriving a fifth binary signal set having 4 $m$ bits, the 2 $m$ most significant bits of said fifth binary signal set comprising the 2 $m$ least significant bits of said $(A_1B_1)$ signal set and the 2 $m$ least significant of said fifth signal set comprising the 2 $m$ least significant bits of said $(A_2B_2)$ signal set;

second register means for positively shifting said third binary signal set $m-1$ bits to derive a sixth binary signal set representative of $2^{m-1}$ times said third binary signal set;

third register means for positively shifting said fourth binary signal set $m-1$ bits to derive a seventh binary signal representative of $2^{m-1}$ times said fourth binary signal set; and means for processing said fifth, sixth and seventh binary signal sets to derive an output binary signal set representative of the sum of the numbers represented by said fifth, sixth and seventh sets.

11. Apparatus according to claim 10 wherein said eleventh data processor means includes first inverter means for reversing the binary value of each bit of said $(A_1^2+B_2^2)$ binary signal set to derive an $\overline{(A_1^2+B_2^2)}$ binary signal set, and first adder means for adding in binary said $(A_1+B_2)^2$ and $\overline{(A_1^2+B_2^2)}$ binary signal sets to derive a $(2A_1B_2-1)$ binary signal set representative of a number equal to the sum of the numbers represented by said $(A_1+B_2)^2$ and $\overline{(A_1^2+B_2^2)}$ binary signal sets; and said twelfth data processor means includes second inverter means for reversing the binary value of each bit of said $(A_2+B_1^2)$ binary signal set to derive an $\overline{(A_2^2+B_1^2)}$ binary signal set, and second adder for adding in binary said $(A_2+B_1)^2$ and $\overline{(A_2^2+B_1^2)}$ binary signal sets and a binary signal set representative of decimal 2 to derive a $(2A_2B_1+1)$ binary signal set representative of a number equal to the sum of 2 plus the numbers represented by said $(A_2+B_1)^2$ and $\overline{(A_2^2+B_1^2)}$ binary signal sets; said second register means processing said $(2A_1B_2-1)$ binary signal set and said fifth binary signal set to derive a $(A_1B_1\times2^{2m}+A_2B_2+A_1B_2\times2^m-2^{m-1})$ binary signal set representative of a number equal to $2^{m-1}$ times the number represented by said $(2A_1B_2-1)$ binary signal set plus the number represented by said fifth binary signal set; and said third register means and last-named means processing said $(2A_2B_1+1)$ binary signal and said $(A_1B_1\times2^{2m}+A_2B_2+A_1B_2\times2^m-2^{m-1})$ binary signal set to derive a AB binary signal set representative of a number equal to $2^{m-1}$ times the number represented by said $(2A_2B_1+1)$ binary signal set plus the number represented by said $(A_1B_1\times2^{2m}+A_2B_2+A_1B_2\times2^m-2^{m-1})$ binary signal set.

12. Apparatus according to claim 10 wherein said ninth data processor means comprises second inverter means for reversing the binary value of each bit of said $(A_1+B_1)^2$ signal set to derive a $\overline{(A_1+B_1)}^2$ binary signal set; thirteenth data processor means for processing said $(A_1^2+B_1^2)$ and $\overline{(A_1+B_1)}^2$ signal sets to derive a $(A_1^2+B_1^2)+\overline{(A_1+B_1)}^2$ binary signal set representative of a number equal to the sum of the numbers represented by said $(A_1^2+B_1^2)$ and $\overline{(A_1+B_1)}^2$ signal sets; third inverter means for reversing the binary value of each bit of said $(A_1^2+B_1^2)+\overline{(A_1+B_1)}^2$ signal set to derive a $\overline{(A_1^2+B_1^2)+\overline{(A_1+B_1)}^2}$ binary signal set; and means for dropping the least significant bit from said $\overline{(A_1^2+B_1^2)+\overline{(A_1+B_1)}^2}$ signal set.

13. Apparatus according to claim 10 wherein said tenth data processor means comprises second inverter means for reversing the binary value of each bit of said $(A_2+B_2)^2$ signal set to derive a $\overline{(A_2+B_2)}^2$ binary signal set; thirteenth data processor means for processing said $(A_2^2+B_2^2)$ and $\overline{(A_2+B_2)}^2$ signal sets to derive a $(A_2^2+B_2^2)+\overline{(A_2+B_2)}^2$ binary signal set representative of a number equal to the sum of the numbers represented by said $(A_2^2+B_2^2)$ and $\overline{(A_2+B_2)}^2$ signal sets; third inverter means for reversing the binary value of each bit of said $(A_2^2+B_2^2)+\overline{(A_2+B_2)}^2$ signal set to derive a $\overline{(A_2^2+B_2^2)+\overline{(A_2+B_2)}^2}$ binary signal set; and means for dropping the least significant bit from said $\overline{(A_2^2+B_2^2)+\overline{(A_2+B_2)}^2}$ signal set.

14. Apparatus according to claim 10 wherein said ninth and tenth data processor means comprise second inverter means for reversing the binary values of each bit of said $(A_1+B_1)^2$ and $(A_2+B_2)^2$ signal sets to derive $\overline{(A_1+B_1)}^2$ and $\overline{(A_2+B_2)}^2$ binary signal sets, respectively; thirteenth data processor means for processing said $(A_1^2+B_1^2)$ and $\overline{(A_1+B_1)}^2$ signal sets to derive an $(A_1^2+B_1^2)+\overline{(A_1+B_1)}^2$ binary signal set representative of a number equal to the sum of the numbers represented by said $(A_1^2+B_1^2)$ and $\overline{(A_1+B_1)}^2$ signal sets; fourteenth data processor means for processing said $(A_2^2+B_2^2)$ and $\overline{(A_2+B_2)}^2$ signal sets to derive a $(A_2^2+B_2^2)+\overline{(A_2+B_2)}^2$ binary signal set representative of a number equal to the sum of the numbers represented by said $(A_2^2+B_2^2)$ and $\overline{(A_2+B_2)}^2$ signal sets; third inverter means for reversing the binary values of each bit of said $(A_1^2+B_1^2)+\overline{(A_1+B_1)}^2$ and $(A_2^2+B_2^2)+\overline{(A_2+B_2)}^2$ signal sets to derive $\overline{(A_1^2+B_1^2)+\overline{(A_1+B_1)}^2}$ and $\overline{(A_2^2+B_2^2)+\overline{(A_2+B_2)}^2}$ binary signal sets, respectively; and means for dropping the least significant bit from each of said $\overline{(A_1^2+B_1^2)+\overline{(A_1+B_1)}^2}$ and $\overline{(A_2^2+B_2^2)+\overline{(A_2+B_2)}^2}$ signal sets to derive said $(A_1B_1)$ and $(A_2B_2)$ binary signal sets, respectively.

* * * * *